United States Patent
Hsiao

(10) Patent No.: US 8,886,048 B2
(45) Date of Patent: Nov. 11, 2014

(54) OPTICAL TRANSCEIVER DEVICE

(75) Inventor: Yu-Chao Hsiao, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 119 days.

(21) Appl. No.: 13/537,060

(22) Filed: Jun. 29, 2012

(65) Prior Publication Data

US 2013/0148979 A1  Jun. 13, 2013

(30) Foreign Application Priority Data

Dec. 13, 2011  (TW) .............................. 100145868 A

(51) Int. Cl.
  *H04B 10/40* (2013.01)
  *H04B 10/69* (2013.01)

(52) U.S. Cl.
  USPC ............ 398/139; 398/137; 398/156; 398/162

(58) Field of Classification Search
  CPC ..... H04B 10/2503; H04B 10/40; H04B 10/43
  USPC ........................................................ 398/139
  See application file for complete search history.

(56) References Cited

U.S. PATENT DOCUMENTS

| | | | | |
|---|---|---|---|---|
| 7,477,847 | B2 * | 1/2009 | Hofmeister et al. | 398/135 |
| 7,734,180 | B2 * | 6/2010 | Maeda et al. | 398/79 |
| 2004/0247320 | A1 * | 12/2004 | Bickham et al. | 398/71 |
| 2009/0238568 | A1 * | 9/2009 | Lyubomirsky | 398/79 |
| 2009/0317086 | A1 * | 12/2009 | Morohashi et al. | 398/135 |

* cited by examiner

*Primary Examiner* — Nathan Curs
(74) *Attorney, Agent, or Firm* — Novak Druce Connolly Bove + Quigg LLP

(57) ABSTRACT

An optical transceiver device includes a transmitter, a first and a second optical circulators and a receiver. The transmitter transmits a light signal uploaded with an electrical signal. The first and second optical circulators each include three ports. The second port of the second optical circulator is configured for transmitting the light signal circulated via the first and second ports of the first optical circulator and the first port of the second optical circulator, and the third port of the second optical circulator is configured for receiving an incoming light signal. The receiver receives the incoming light signal circulated back via the first port of the second optical circulator, and the second and third ports of the first optical circulator and converts the incoming light signal to be an electrical signal.

5 Claims, 3 Drawing Sheets

OPTICAL TRANSCEIVER DEVICE

BACKGROUND

1. Technical Field

The present disclosure relates to an optical transceiver device.

2. Description of Related Art

In conventional optical communication, transmitters and receivers are separately mounted, which needs more components and thus it goes against the trend of miniturization.

What is needed, therefore, is an optical transceiver device, which can overcome the above shortcomings.

BRIEF DESCRIPTION OF THE DRAWINGS

Many aspects of the present optical transceiver device can be better understood with reference to the following drawings. The components in the drawings are not necessarily drawn to scale, the emphasis instead being placed upon clearly illustrating the principles of the present optical transceiver device. Moreover, in the drawings, like reference numerals designate corresponding parts throughout the several views.

DETAILED DESCRIPTION

Embodiments of the present optical transceiver device will now be described in detail below and with reference to the drawings.

Figure 1:
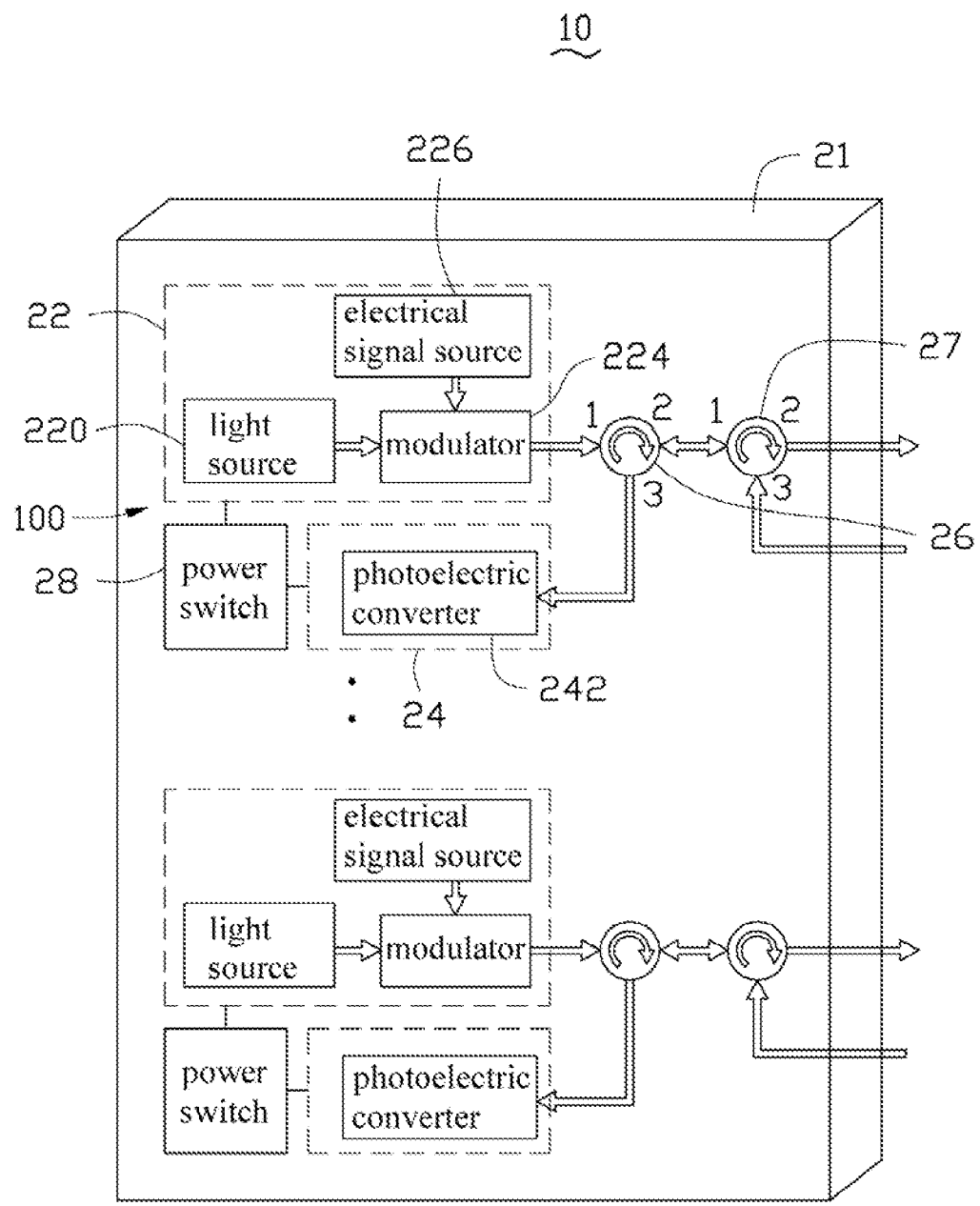
FIG. 1 is a schematic view of an optical transceiver device in accordance with a first embodiment.

FIG. 1, is an optical transceiver device 10 in accordance with a first embodiment. The optical transceiver device 10 includes at least one transceiver module 100. Each transceiver module 100 includes a transmitter 22, a receiver 24, a first optical circulator 26, a second optical circulator 27, a power switch 28 and a housing 21 receiving all of the members.

The transmitter 22 is configured for transmitting light signals uploaded with electrical signals. In particular, the transmitter 22 includes a light source 220, a modulator 224 and an electrical signal source 226. The light source 220 may be a laser diode emitting a light. The modulator 224 may be a Mach-Zehnder Modulator or other modulators capable of phase modulation or frequency modulation of the light. The electrical signal source 226 provides an electrical signal, such as data that needs to be transmitted in the light, and then the modulator 224 modulates the phase or the frequency of the light to be a modulated light signal representing the electrical signal.

The receiver 24 includes a photoelectric converter 242 such as a photodiode. The photoelectric converter 242 is configured for receiving an incoming light signal and converting the incoming light signal into an electrical signal. In the present embodiment, the modulated light signal is the same as the incoming light signal, and the electrical signal transmitted out by the transmitter 22 is the same as the electrical signal obtained by the receiver 24. In other embodiments, the incoming light signal may be different from the modulated light signal, for example, a wavelength of the incoming light signal may be different from a wavelength of the modulated light signal.

The first optical circulator 26 and the second optical circulator 27 have a similar structure. Each of the first optical circulator 26 and the second optical circulator 27 has three ports 1, 2 and 3. The port 1 of the first optical circulator 26 is connected to the transmitter 22, the port 3 of the first optical circulator 26 is connected to the receiver 24, and the port 2 of the first circulator 26 is connected to the port 1 of the second optical circulator 27.

In the present embodiment, the first and second optical circulators 26, 27 work along a clockwise direction. That is, the modulated light signal enters the first optical circulator 26 through the port 1, and exits from the first optical circulator 26 through the port 2, then enters the second optical circulator 27 through the port 1, and then is output from the second optical circulator 26 through the port 2. The incoming light signal enters the second optical circulator 27 through the port 3, and exits from the second optical circulator 27 through the port 1, then enters the first optical circulator 26 through the port 2, and is output from the first optical circulator 26 through the port 3, and finally received by the receiver 24. In other embodiments, the first and second optical circulators 26, 27 may work along a counter-clockwise direction.

Due to the first and second optical circulators 26, 27, the transmitter 22 and the receiver 24 can work at a same time, and in the first and second optical circulators 26, 27, the incoming light signal and the transmitted modulated light signal may not influence each other.

The power switch 28 is connected to both the transmitter 22 and the receiver 24, and is configured for selectively turning on or off at least one of the transmitter 22 and the receiver 24. Because of the power switch 28, the transmitter 22 and the receiver 24 can work alternatively, and the transceiver module 100 can be changed to be a total transmitter or a total receiver. In cases that the transmitter 22 and the receiver 24 always work at a same time, the power switch 28 can be omitted.

Figure 2:
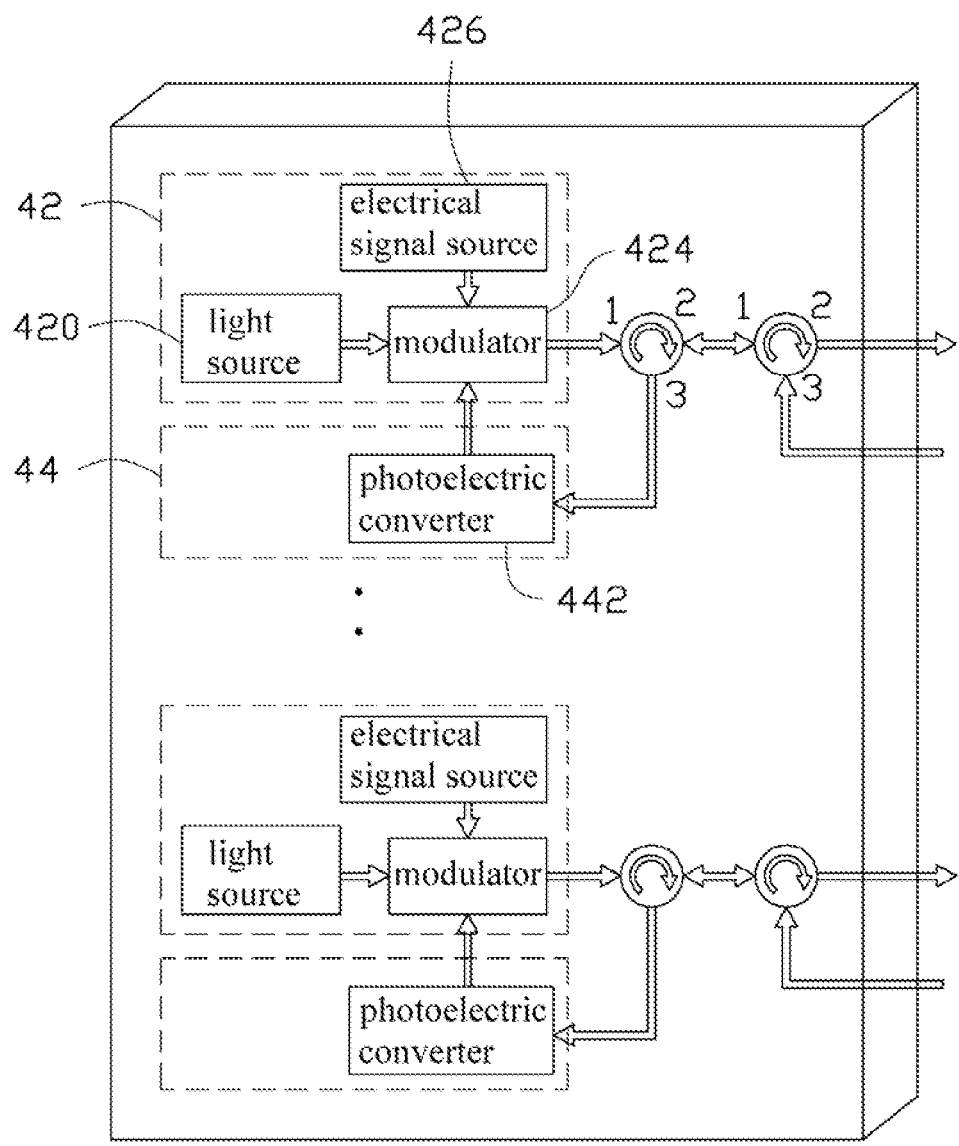
FIG. 2 is a schematic view of an optical transceiver device in accordance with a second embodiment.

FIG. 2, is an optical transceiver device 20 in accordance with a second embodiment. A main difference between the optical transceiver device 20 and the optical transceiver device 10 is that the receiver 44 is connected to the modulator 424 of the transmitter 42.

The receiver 44 includes a photoelectric converter 442 for converting the incoming light signal entered the receiver 44 into an electrical signal, and then the electrical signal enters the modulator 424. By this configuration, after the modulator 424 modulates the light emitted by the light source 420 based on the electrical signal from the electrical signal source 426, then the modulator 424 can re-modulate the modulated light based on the electrical signal provided by the photoelectric converter 442. The electrical signal from the electrical signal source 426 is the same as the electrical signal from the photoelectric converter 442, thus the electrical signal provided for the modulator 424 is augmented. Thereby a quality of the modulated light signal can be enhanced.

Figure 3:
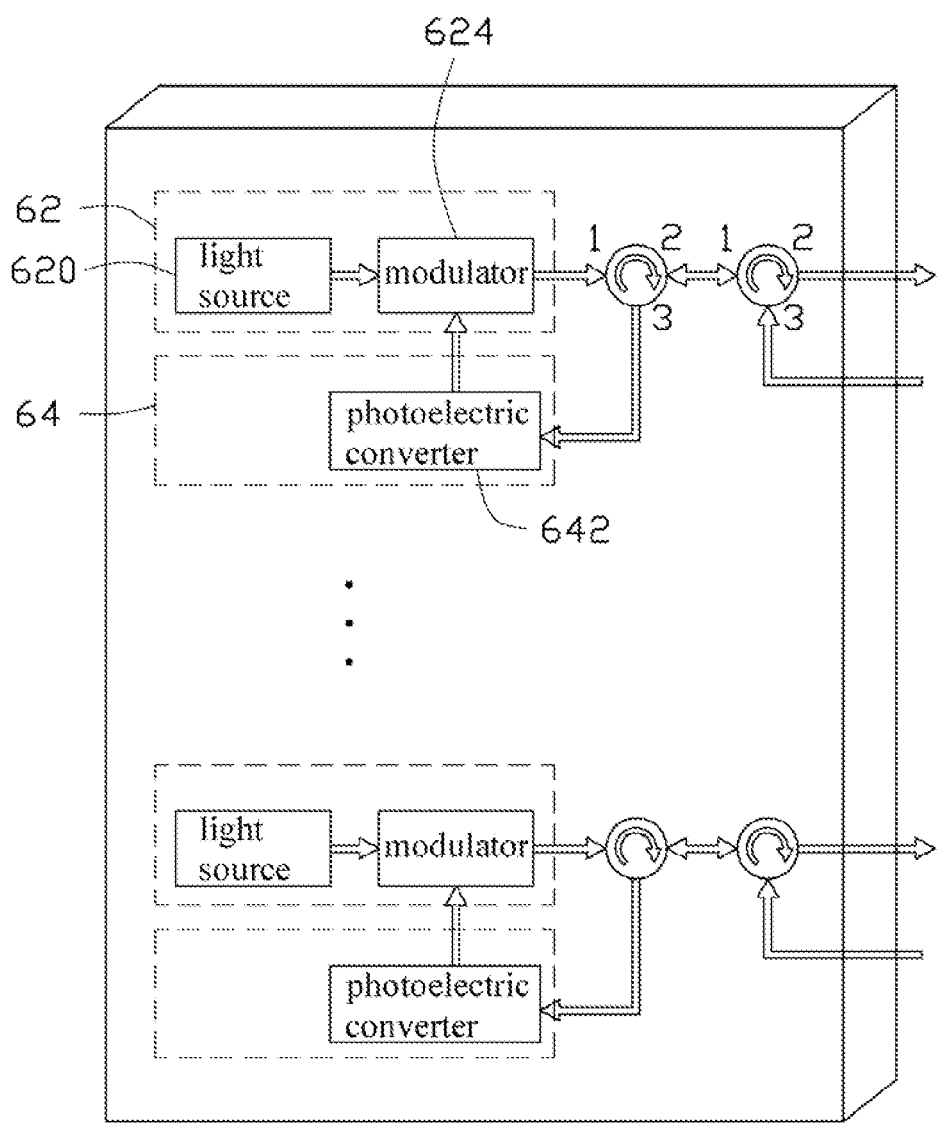
FIG. 3 is a schematic view of an optical transceiver device in accordance with a third embodiment.

FIG. 3, is an optical transceiver device 50 in accordance with a third embodiment. A main difference between the optical transceiver device 50 and the optical transceiver device 20 is that the transmitter 62 includes only a light source 620 and a modulator 624. The modulator 624 modulates light emitted by the light source 620 based on the electrical signal from the photoelectric converter 642 of the receiver 64. By this configuration, additional electrical signal source for the modulator 624 can be omitted.

The optical transceiver devices described-above has integrated a transmitter and a receiver in a housing, and more optical transceiver modules can be integrated in the housing. The housing can have a single circuit board receiving all of the members. Due to the first and second optical circulators, the transmitter and the receiver can work at a same time. Relative to those separated transmitters and receivers, the optical transceiver devices are more compact and thus are more applicable.

It is understood that the above-described embodiments are intended to illustrate rather than limit the disclosure. Variations may be made to the embodiments and methods without departing from the spirit of the disclosure. Accordingly, it is appropriate that the appended claims be construed broadly and in a manner consistent with the scope of the disclosure.

What is claimed is:

1. An optical transceiver device, comprising:
a transmitter comprising a light source for emitting light, an electrical signal source configured for providing an electrical signal, and a modulator configured for modulating the light in response to the electrical signal, thereby producing a modulated light signal;
a first optical circulator and a second optical circulator, each of the first and second optical circulators comprising a first port, a second port and a third port, the first port of the first optical circulator optically connected to the transmitter and configured for receiving the modulated light signal, the second port of the first optical circulator optically connected to the first port of the second optical circulator, thus allow the modulated light signal to exit from the first optical circulator through the second port thereof and enter the second optical circulator through the first port thereof, the second port of the second optical circulator configured for outputting the modulated light signal, and the third port of the second optical circulator configured for receiving an incoming light signal, the first and second optical circulators allowing the incoming light signal to exit from the second optical circulator through the first port thereof and enter the first optical circulator through the second port thereof; and
a receiver comprising a photoelectric converter optically connected to the third port of the first optical circulator and configured for receiving the incoming light signal exiting therefrom and converting the incoming light signal into an electrical signal, the photoelectric converter further connected to the modulator and configured for providing an electrical signal matching the electrical signal from the electrical signal source to the modulator.

2. The optical transceiver device of claim 1, further comprising a housing receiving the transmitter, the first optical circulator, the second optical circulator and the receiver therein.

3. The optical transceiver device of claim 1, further comprising a power switch connected to both the transmitter and the receiver, and configured for selectively turning on at least one of the transmitter and the receiver.

4. An optical transceiver device comprising a housing, and a plurality of optical transceiver modules mounted in the housing, each of the optical transceiver module comprising:
a transmitter comprising a light source for emitting light, an electrical signal source configured for providing an electrical signal, and a modulator configured for modulating the light in response to the electrical signal, thereby producing a modulated light signal;
a first optical circulator and a second optical circulator, each of the first and second optical circulators comprising a first port, a second port and a third port, the first port of the first optical circulator optically connected to the transmitter and configured for receiving the light signal, the second port of the first optical circulator optically connected to the first port of the second optical circulator, thus allow the light signal to exit from the first optical circulator through the second port thereof and enter the second optical circulator through the first port thereof, the second port of the second optical circulator configured for outputting the light signal, and the third port of the second optical circulator configured for receiving an incoming light signal, the first and second optical circulators allowing the incoming light signal to exit from the second optical circulator through the first port thereof and enter the first optical circulator through the second port thereof; and
a receiver comprising a photoelectric converter optically connected to the third port of the first optical circulator and configured for receiving the light signal exiting therefrom and converting the light signal into an electrical signal, the photoelectric converter further connected to the modulator and configured for providing an electrical signal, which matches the electrical signal from the electrical signal source to the modulator.

5. The optical transceiver device of claim 4, wherein each optical transceiver module further comprises a power switch connected to both the transmitter and the receiver, and is configured for selectively turning on at least one of the transmitter and the receiver.

* * * * *